Nov. 10, 1953 — L. I. CHAPMAN — 2,658,220
DISH MOP
Filed Jan. 16, 1951
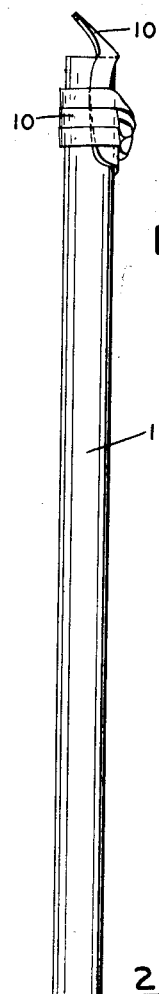
FIG. 1
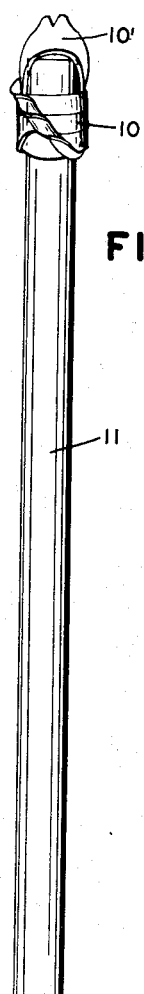
FIG. 2
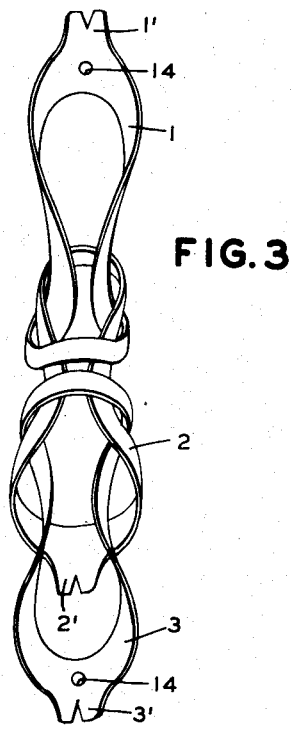
FIG. 3
FIG. 4
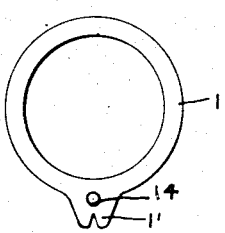
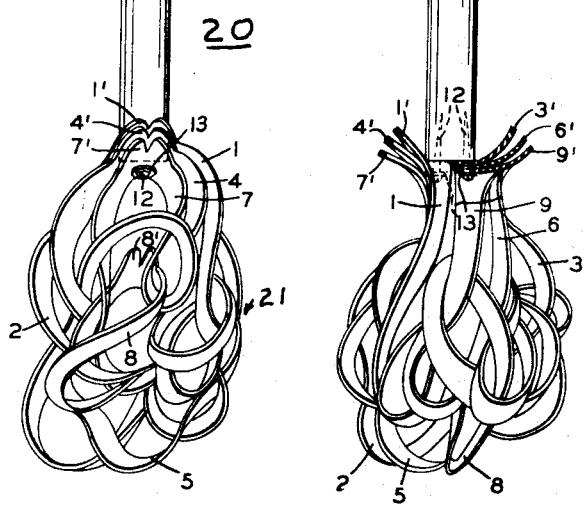
INVENTOR.
*Laura I. Chapman*
BY
*Virgil F. Davico*
ATTORNEY Patented Nov. 10, 1953

2,658,220

UNITED STATES PATENT OFFICE 2,658,220

DISH MOP

Laura I. Chapman, Patten, Maine

Application January 16, 1951, Serial No. 206,261

4 Claims. (Cl. 15—209)

This invention relates to cleaning devices and in particular to a mop for cleaning the utensils used in the preparation and the serving of food.

The dish mops commonly used in cleaning utensils, dishes and similar containers employed in preparing and serving food generally comprise a wooden handle to one end of which is attached a mop head formed as a bundle of twisted cotton yarn or similar soft, wettable fibre. Mop heads when wet are quite soft and wipe rather than scour. These soft mop heads when moved through the cleaning medium cause some circulation of the cleaning medium but the action is not sufficiently pronounced or localized to add materially to the cleaning action. The soft mop heads are unsuited for cleaning utensils in which greasy or sticky materials such as gravies, flour batters, mashed potatoes, etc., have been prepared as these materials adhere to the fibres of the mop head to form a mass therewith which is incapable of either wiping or scouring the utensil surfaces. The wettable fibre mop heads readily retain food particles and are difficult to clean and since they cannot be dried quickly, easily mildew and sour.

It is a principal object of this invention to provide a dish mop, suitable for use in the cleaning of utensils, dishes and similar containers employed in the preparation and the serving of food, which is of simple and durable construction, which exerts a pronounced scouring action on the surfaces over which it is moved and enhances its cleaning action by setting up an intense localized turbulent circulation of the cleaning solution on said surfaces, and which includes a mop head formed of a material readily freed of greases and food particles by agitation in the cleaning solution and easily and quickly dried so that it will not sour or mildew after use.

It is also a principal object of this invention to provide a dish mop of the character referred to, which includes an elongated handle carrying at one end thereof a mop head formed of a plurality of flat rubber rings arranged as a plurality of chains whose ends are stacked on the end of the handle to thereby form a plurality of loops which when moved over the surfaces to be cleaned engage and scour said surfaces and simultaneously set up a turbulent circulation of the cleaning solution on said surfaces to enhance the cleaning action.

It is a further principal object of this invention to provide a dish mop of the character referred to, which includes an elongated handle carrying at one end thereof a mop head and carrying adjacent the other end a flat rubber ring looped thereabout to frictionally engage said handle, said ring including a loop covering said other end to shield the hand of the user from contact with said other end.

The further objects, advantages and features of the invention will become apparent from a consideration of the following description of a presently preferred embodiment of the invention, taken with the accompanying drawings, in which:

Fig. 1 is a plan view of a present preferred form of the novel dish mop of the invention;

Fig. 2 is a view similar to Fig. 1 but partly in section and rotated through 90°;

Fig. 3 is a plan view of one of the groups of rings used to form the mop head and showing the manner in which the group of rings is assembled; and;

Fig. 4 is a plan view of one of the rings used in forming the mop head.

The novel dish mop 20 of the invention, as shown in Fig. 1, comprises an elongated mop handle 11 carrying adjacent one end the hand guard 10 and at the other end a mop head 21 formed by the rings 1, 2, 3, 4, 5, 6, 7, 8 and 9. The mop handle 11 may be of any convenient material and of any convenient length and size. It is at present preferred to form the mop handle 11 of a hardwood dowel measuring approximately twelve inches in length and approximately one-half an inch in diameter.

The mop head 21 as well as the hand guard 10 are formed from similar flat rings 1-9 each provided with an ear like tab 1'-9', respectively, extending outwardly therefrom. The rings 1-9 are formed of a comparatively soft, resilient material not appreciably dissolved or attacked by the usual cleaning solutions or the material to be removed from the utensils in the cleaning operation. By cleaning solutions as used in this specification is intended the usual soap-water or other detergent-water solutions commonly employed in cleaning utensils. Rubber has been found to be a satisfactory material for the rings 1-9.

The rings 1-9 should be so proportioned that while they will readily bend and otherwise deform as the mop 20 is manipulated in the cleaning operations, they are sufficiently stiff and resistant to make possible a pronounced scouring action when the mop head 21 is moved over the surfaces to be cleaned. A mop head 21 of convenient size for general kitchen use is obtained by employing nine rings 1-9 of approximately 3⅛ inches in diameter and about ½ inch wide.

Rings of these dimensions and with a proper tab are on general sale as rubber sealing rings for glass mason jars.

The mop head 21 is formed of the nine rings 1–9 arranged into three separate groups, the rings 1, 2 and 3 forming one group, the rings 4, 5 and 6 forming the second group and the rings 7, 8 and 9 forming the third group. The rings of each group are interlinked to form a separate three link chain. In interlinking, or interlocking the rings 1, 2 and 3 as best shown in Fig. 3, the tabbed portion 2' of the ring 2 is passed downwardly through the ring 1 and then outwardly of the ring 1 to provide a loop extending from the ring 1 at the portion thereof diametrically opposite the tap 1', the remainder of the ring 2 is passed through the extending loop to provide a new loop extending from the ring 1. The portion of the ring 3 diametrically opposite the tab 3' thereof is then passed downwardly through said new loop of the ring 2 and outwardly to form a loop extending outwardly from the ring 2, the tabbed portion 3I of the ring 3 is passed through the latter loop and pulled outwardly to complete the chain. It is to be noted that the tabs 1' and 3' of the rings 1 and 3 extend outwardly of the chain in opposite directions. The same procedure is followed in forming the chains comprising the rings 4, 5 and 6 and the rings 7, 8 and 9. If a larger mop head is desired each chain may include more than three rings. Also, larger or smaller rings may be used to make a mop head of desired size.

The end rings 1, 3, 4, 6, 7 and 9 are pierced to form the small hole 14 in the portions thereof adjacent the respective tabs 1', 3', 4', 6', 7', and 9'. Both ends of the chains are stacked so that the tab 4' of the ring 4 covers the tab 7' of the ring 7 and the tab 1' of the ring 1 covers the tab 4' of the ring 4 while the tab 6' of the ring 6 covers the tab 9' of the ring 9 and the tab 3' of the ring 3 covers the tab 6' of the ring 6. A simple way of accomplishing this end is to pass a screw 12 through the hole 14 of ring 1 then through hole 14 of the ring 4 and then through the hole 14 of the ring 7 while a second screw 12 is passed first through the hole 14 of ring 3 then through the hole 14 of the ring 6 and finally through the hole 14 of the ring 9. One set of stacked chain ends is then positioned on one end of the handle member 11 with the aligned stacked tabs extending outwardly of the handle member 11 and with the inner peripheries of the rings overlying the diameter of the handle member 11. Holes 15 are preferably drilled in the end of the handle member 11 at approximately the center of each half of the end of the handle member 11 to assure proper positioning of the screws 12. The screw 12 of said one set of stacked ends is then worked into one of said drilled holes until one set of stacked ends are firmly fastened in position. The other set of stacked ends is then positioned contiguous to said one set of ends with its tabs extending outwardly of the handle member 11 and the inner peripheries of the rings again overlying the diameter of the handle member 11, the screw 12 is then screwed into the other one of said drilled holes until said other set of stacked chain ends is firmly positioned. To prevent the heads of the screws 12 from going through one or more of the rings, a burr guard 13 is preferably positioned under said screw heads before the screws 12 are inserted in the holes 14. The screws 12 and the burrs 13 are preferably rustproof.

The ring 10 which frictionally engages the other end of the handle member 11 and serves to protect the hand of the user as well as to provide for a firm hold on the handle member 11, is wound or looped around said other end so that the windings are smooth on one side and include a twist on the opposite side, as shown in Figs. 1 and 2. To accomplish this end, a loop of the ring 10 is placed astraddle the handle member 11 with the tab 10' covering said other end of the handle member 11. This loop is held firmly against the handle member 11 at the location of the bottom winding. The remainder of the ring 10 is then wound circumferentially around the handle member 11 three times. The first winding begins at one end of said straddle loop and passes over the other end of said straddle loop. The twists in the ring 10 which result from the windings are localized in the portion of the ring 10 connecting the end of the uppermost winding and said other end of the straddle loop.

The completed mop head 21 as shown in Figs. 1 and 2 includes a plurality of comparatively short stiff loops connected to the tabbed ends of the chains by longer, more flexible portions of the rings. In use, and by reason of this construction, turbulent localized circulation of the cleaning solution over the surfaces of the utensils is easily set up by "swishing" the mop head back and forth over said surfaces thus greatly enhancing the cleaning action and lessening the effort required by the operator. The comparatively stiff loops make possible a pronounced scouring action when they are moved in contact with the surfaces to be cleaned. The stacked tabs being quite stiff, give a pronounced scouring action when they are brought into contact with the utensil surfaces. The hand guard 10 provides for a secure grip even when slippery, soap-water cleaning solutions are employed and protects the palm of the operator from contact with the sharp edge of the handle member 11.

The mop head 21 may easily be compressed and made to enter the mouths of bottles not much larger than the diameter of the handle member 11. The mop head 21 when in such bottles may be made, because of its stiff loops, to very effectively scour the inside surfaces.

While the invention has been described with particular reference to a specific embodiment, it is to be understood that it is not to be limited thereto, but is to be construed broadly and restricted solely by the scope of the appended claims.

I claim:

1. A utensil cleaning mop comprising an elongated handle member, a resilient chain formed of a plurality of flat, flexible rings, adjacent rings of said chain looped one within the other, the end rings of said chain each including a tab integral therewith and extending outwardly therefrom, the portions of said end rings from which said tabs extend positioned on one end of said handle member in opposed relation and with said tabs extending outwardly from said handle member, and means fastening said end rings to said one end of said handle member.

2. A utensil cleaning mop comprising an elongated handle member, a plurality of resilient chains each formed of a plurality of interlocked flat, flexible rings, corresponding portions of the end rings of said chains positioned on one end of said handle member in stacked relation, and means fastening said corresponding portions to said one end of said handle member.

3. A utensil cleaning mop comprising an elongated handle member, a plurality of resilient chains each formed of a plurality of flat, flexible rings, adjacent rings of each of said chains looped one within the other, each end ring of each of said chains including a tab integral therewith and extending outwardly therefrom, the portions of said end rings from which said tabs extend, of corresponding end rings of said chains, arranged in a pair of oppositely disposed stacks positioned on one end of said handle member with said tabs extending outwardly from said handle member, and means attaching said stacked portions to said one end of said handle member.

4. A utensil cleaning mop comprising an elongated handle member having a transverse surface at one end thereof, three chains, each chain including three flat, rubber rings, adjacent rings of each of said chains looped one within the other, each of said rings having a tab integral therewith and extending outwardly therefrom, the portions of said end rings from which said tabs extend, of corresponding end rings of said chains, stacked on said transverse surface with said tabs extending outwardly of said transverse surface, and means fastening said portions to said one end of said handle member.

LAURA I. CHAPMAN.

References Cited in the file of this patent

UNITED STATES PATENTS

| Number | Name | Date |
|---|---|---|
| 264,123 | Baldwin | Sept. 12, 1882 |
| 392,102 | Buty | Oct. 30, 1888 |
| 428,144 | Russell | May 20, 1890 |
| 514,840 | Streeter | Feb. 13, 1894 |
| 578,021 | Morse | Mar. 2, 1897 |
| 700,499 | Irving | May 20, 1902 |
| 972,400 | Partridge | Oct. 11, 1910 |
| 1,290,565 | Jarvis | Jan. 7, 1919 |
| 1,350,807 | Jackson | Aug. 24, 1920 |
| 1,529,690 | Cornell | Mar. 17, 1925 |

FOREIGN PATENTS

| Number | Country | Date |
|---|---|---|
| 240,032 | Great Britain | Sept. 24, 1925 |
| 382,240 | Great Britain | Oct. 20, 1932 |